US010819593B1

(12) United States Patent
Parthasarathy et al.

(10) Patent No.: US 10,819,593 B1
(45) Date of Patent: Oct. 27, 2020

(54) REPORTING CONTINUOUS SYSTEM SERVICE STATUS BASED ON USING REAL-TIME SHORT-TERM AND LONG-TERM ANALYSIS TECHNIQUES

(71) Applicant: Harness Inc., San Francisco, CA (US)

(72) Inventors: Sriram Parthasarathy, Fremont, CA (US); Raghvendra Singh, Fremont, CA (US); Parnian Zargham, Santa Clara, CA (US); Rishikesh Singh, Sunnyvale, CA (US); Jyoti Bansal, San Francisco, CA (US)

(73) Assignee: Harness Inc., San Francisco, CA (US)

( * ) Notice: Subject to any disclaimer, the term of this patent is extended or adjusted under 35 U.S.C. 154(b) by 0 days.

(21) Appl. No.: 16/737,754

(22) Filed: Jan. 8, 2020

(51) Int. Cl.
*G06F 15/173* (2006.01)
*H04L 12/24* (2006.01)
*H04L 29/06* (2006.01)
*H04L 29/08* (2006.01)

(52) U.S. Cl.
CPC ...... *H04L 41/5096* (2013.01); *H04L 41/0686* (2013.01); *H04L 41/5009* (2013.01); *H04L 67/12* (2013.01); *H04L 67/42* (2013.01)

(58) Field of Classification Search
CPC ..... H04L 41/5096; H04L 67/12; H04L 67/42; H04L 41/0686; H04L 41/5009
See application file for complete search history.

(56) References Cited

U.S. PATENT DOCUMENTS

| | | | | |
|---|---|---|---|---|
| 6,691,244 B1* | 2/2004 | Kampe | ................... | G06F 11/00 714/4.1 |
| 7,788,700 B1* | 8/2010 | Feezel | ..................... | G06F 21/31 713/163 |
| 2002/0007468 A1* | 1/2002 | Kampe | ................... | H04L 43/00 714/4.12 |
| 2008/0153521 A1* | 6/2008 | Benaouda | ............... | H04W 8/26 455/466 |
| 2012/0127951 A1* | 5/2012 | Dhanda | ............... | H04W 74/006 370/330 |
| 2012/0195250 A1* | 8/2012 | Jain | ........................ | H04L 1/1854 370/312 |
| 2013/0021971 A1* | 1/2013 | Jain | ....................... | H04L 1/1887 370/328 |
| 2017/0091397 A1* | 3/2017 | Shah | ..................... | H04L 9/3236 |

\* cited by examiner

*Primary Examiner* — Thanh T Nguyen
(74) *Attorney, Agent, or Firm* — Bachmann Law Group PC

(57) ABSTRACT

A system monitors applications, analyzes metrics, and provides a dashboard that communicates whether an application is performing as expected. The metric analysis includes performing one or more of a first short term data analysis, a second short term analysis based on machine learning-based pattern recognition machines, and a long-term analysis is performed. Transaction performance metrices are determined based on the monitored of the application. The transaction performance metrices are scored, scaled, and aggregated into a single scaled representation for the application. The scaled application value is then reported to a user through a dynamically updated dashboard. The dashboard displays graphical information representing the health of monitored transactions over time. The reported information can be expanded to additional layers of detail.

20 Claims, 11 Drawing Sheets

US 10,819,593 B1

REPORTING CONTINUOUS SYSTEM SERVICE STATUS BASED ON USING REAL-TIME SHORT-TERM AND LONG-TERM ANALYSIS TECHNIQUES

BACKGROUND

Software systems that provides web services, computing device operating systems, cellular phone and mobile device operating systems, and other software typically are executing 24 hours a day and seven days a week. Current application performance management systems provide rule-based alerting. Rule based alerting is static and not flexible, which often times doesn't provide accurate information for dynamic data. Additionally, it is difficult to obtain accurate and meaningful information about different applications executing continuously. With inaccurate information, these systems also do not provide accurate reporting. What is needed is an improved method for reporting monitored dynamic data for software systems.

SUMMARY

The present technology monitors applications, analyzes metrics, and provides a dashboard that indicates whether one or more continuously running applications are performing as expected. The metric analysis includes performing one or more of a first short term data analysis, a second short term analysis based on machine learning-based pattern recognition machines, and a long-term analysis. Transaction performance metrices are determined based on the monitoring of the application. The transaction performance metrices are scored, scaled, and aggregated into a single scaled representation for the application. The scaled application value is then reported to a user through a dynamically updated dashboard. The dashboard displays graphical information representing the health of monitored transactions over time. The reported information can be expanded to additional layers of detail.

In some instances, a method automatically reports the health of a continuously monitored application. The method can include receiving, by an application on a server, data from a delegate on a remote machine, the delegate collecting data from a node within an application that is currently executing. Weighted transaction metric scores are generated by the application server based on the collected data. The weighted transaction scores are can be aggregated by the application server into an application metric score for the application on the remote machine. A scaled application performance score is generated from the aggregated application metric score. The scaled application performance score is provided through an interface provided by the application server to a client device. The scaled application performance score is provided with a plurality of other application performance scores through the dashboard. The dashboard is continuously updated to provide the most recent scaled application performance scores for one or more applications for which data is collected.

In some instances, a non-transitory computer readable storage medium has embodied thereon a program that is executable by a processor to perform a method. The method automatically reports the health of a continuously monitored application. The method includes receiving, by an application on a server, data from a delegate on a remote machine, the delegate collecting data from a node within an application that is currently executing. Weighted transaction metric scores are generated by the application server based on the collected data. The weighted transaction scores are can be aggregated by the application server into an application metric score for the application on the remote machine. A scaled application performance score is generated from the aggregated application metric score. The scaled application performance score is provided through an interface provided by the application server to a client device. The scaled application performance score is provided with a plurality of other application performance scores through the dashboard. The dashboard is continuously updated to provide the most recent scaled application performance scores for one or more applications for which data is collected.

In some instances, a system automatically reports the health of a continuously monitored application. The system includes a server including a memory and a processor. One or more modules are stored in the memory and are executed by the processor to receive, by an application on a server, data from a delegate on a remote machine, the delegate collecting data from a node within an application that is currently executing, generate weighted transaction metric scores by the application server based on the collected data, aggregate the weighted transaction scores by the application server into an application metric score for the application on the remote machine, generate a scaled application performance score from the aggregated application metric score, and provide the scaled application performance score through an interface provided by the application server to a client device, the scaled application performance score provided with a plurality of other application performance scores through the dashboard, the dashboard continuously updated to provide the most recent scaled application performance scores for one or more applications for which data is collected.

The present technology monitors applications, analyzes metrics, and provides a dashboard that indicates whether one or more continuously running applications are performing as expected. The metric analysis includes performing one or more of a first short term data analysis, a second short term analysis based on machine learning-based pattern recognition machines, and a long-term analysis. Transaction performance metrices are determined based on the monitoring of the application. The transaction performance metrics are scored, scaled, and aggregated into a single scaled representation for the application. The scaled application value is then reported to a user through a dynamically updated dashboard. The dashboard displays graphical information representing the health of monitored transactions over time. The reported information can be expanded to additional layers of detail.

Figure 1:
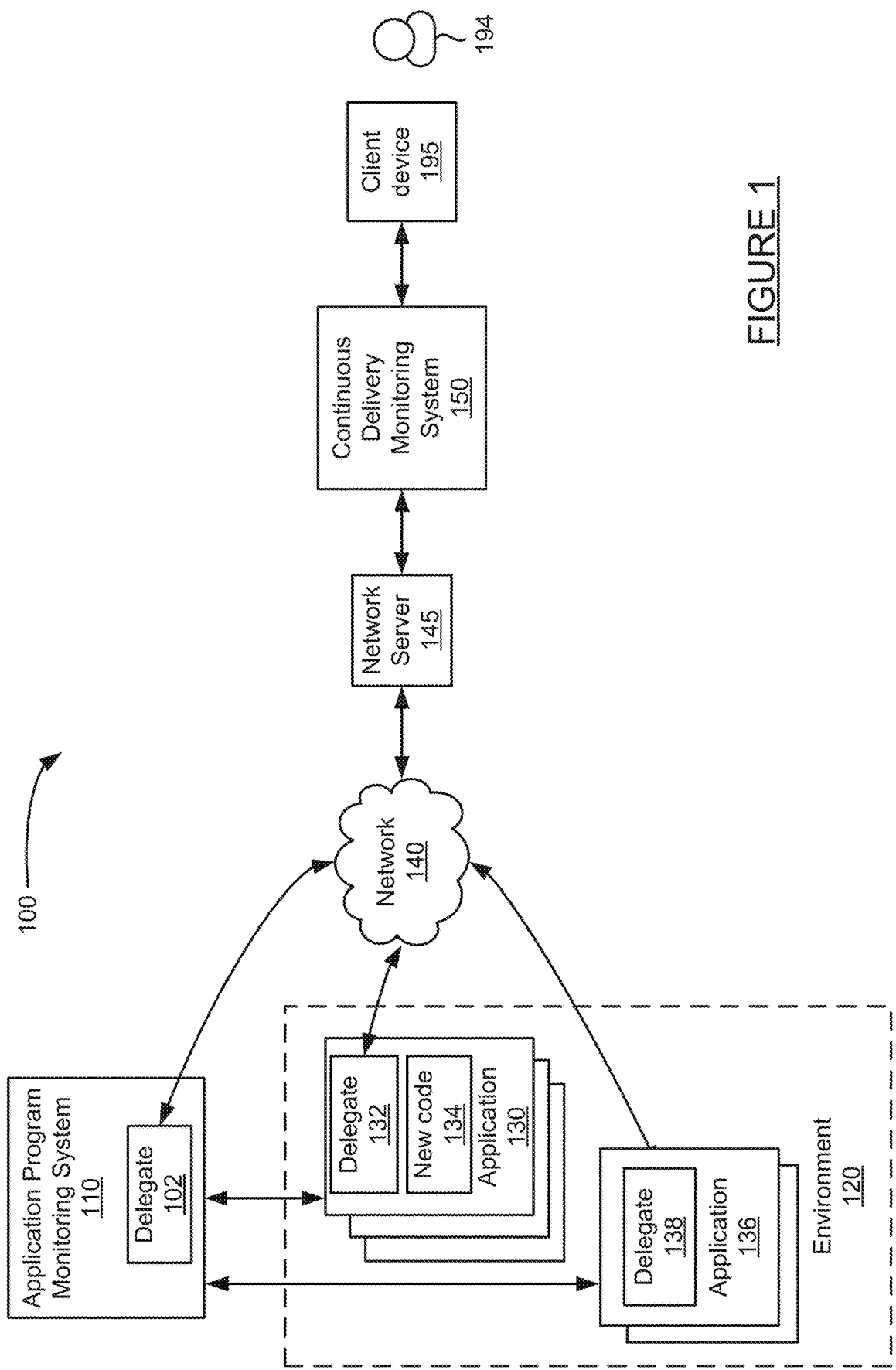
FIG. 1 is a block diagram of a system for providing continuous delivery and service regression detection in real-time for application performance metrics reporting.

FIG. 1 is a block diagram of a system for providing and reporting regarding continuous delivery and service regression detection in real-time for application performance metrics reporting. The block diagram 100 of FIG. 1 includes application program monitoring system 110, environment 120 having application 130 and application 136, network 140, network server 145, continuous delivery monitoring system 150, and client device 195.

Environment 120 may include one or more machines or servers, including mobile devices, client devices with applications and network browsers, servers, and other machines (not illustrated in FIG. 1) at which applications 130 and 136 may be executing. The changes to software may be applied to the one or more applications on servers within environment 120. For example, within application 130, new code 134 may be installed onto application 130.

Network 140 may include one or more private networks, public networks, intranets, the Internet, an intranet, wide-area networks, local area networks, cellular networks, radio-frequency networks, Wi-Fi networks, any other network which may be used to transmit data, and any combination of these networks. d Continuous delivery monitoring system 150 may continuously detect service regression in the performance or behavior of one or more applications within environment 120 in real-time, and before or after a software update 134 is delivered to application 130. To detect service regression, monitoring system 150 may monitor the applications either directly through delegates installed on the applications themselves, such as delegates 132 and 138, or by access to real-time streaming monitoring data (including metrics or other data) provided by application program monitoring system 110, for example via delegate 102.

A delegate may include an agent or other code that is installed to an application or system (e.g., host) and can communicate with remote systems and applications such as continuous delivery monitoring system 150. Each delegate may receive instructions and tasks from monitoring system 150, retrieve information and transmit the information periodically or based on other events to monitoring system 150, may install new code or update code on an application or system, and perform other tasks and operations. In some instances, delegate 102 may be installed on an application program monitoring system, such as a monitoring system provided by AppDynamics, Inc., of San Francisco Calif., to retrieve and transmit a stream of application performance metrics to delivery monitoring system 150. In some instances, delegates may be provided on one or more servers of an environment 120, such as servers hosting application 130 and application 136, to monitor applications and servers that include new code 134 and those that did not host any new code (e.g., control servers).

Network server 145 may receive requests and other transmissions on behalf of monitoring system 150 received over network 140. In some instances, network server 145 may process the request or transmission sore for them to monitoring system 150 for handling. Network server 145 may be implemented on monitoring system 150 or implemented separately, either logically or physically, from system 150.

Continuous delivery monitoring system 150 may provide continuous monitoring of a system. The system may receive an upgrade or change in code, or not be the recipient of an upgrade or new code. The continuous delivery system can determine if there are any immediate or near-term issues, such as performance regression, and may provide reports and alerts based on the determination(s). The continuous delivery monitoring system 150 may include a manager that manages tasks associated with the monitoring, utilization modules, clustering modules, a data store and other functionality. More details for a continuous delivery monitoring system are discussed with respect to FIG. 2.

As monitoring system 150 provides continuous delivery and monitoring of new code, it may provide updates, alerts, notifications, and other information through one or more user interfaces to a user 194. The updates may be provided through a user interface provided within a network browser, such as a web browser, an output from one or more mobile applications, or some other output of a client device 195. Client device 195 may be implemented as any computer that can receive and provide reports, such as for example through a user interface or dashboard, via a network browser on a mobile device, smart phone, tablet, or any other computing machine. Reporting the status and results of continuous delivery service monitoring is discussed in more detail herein.

Figure 2:
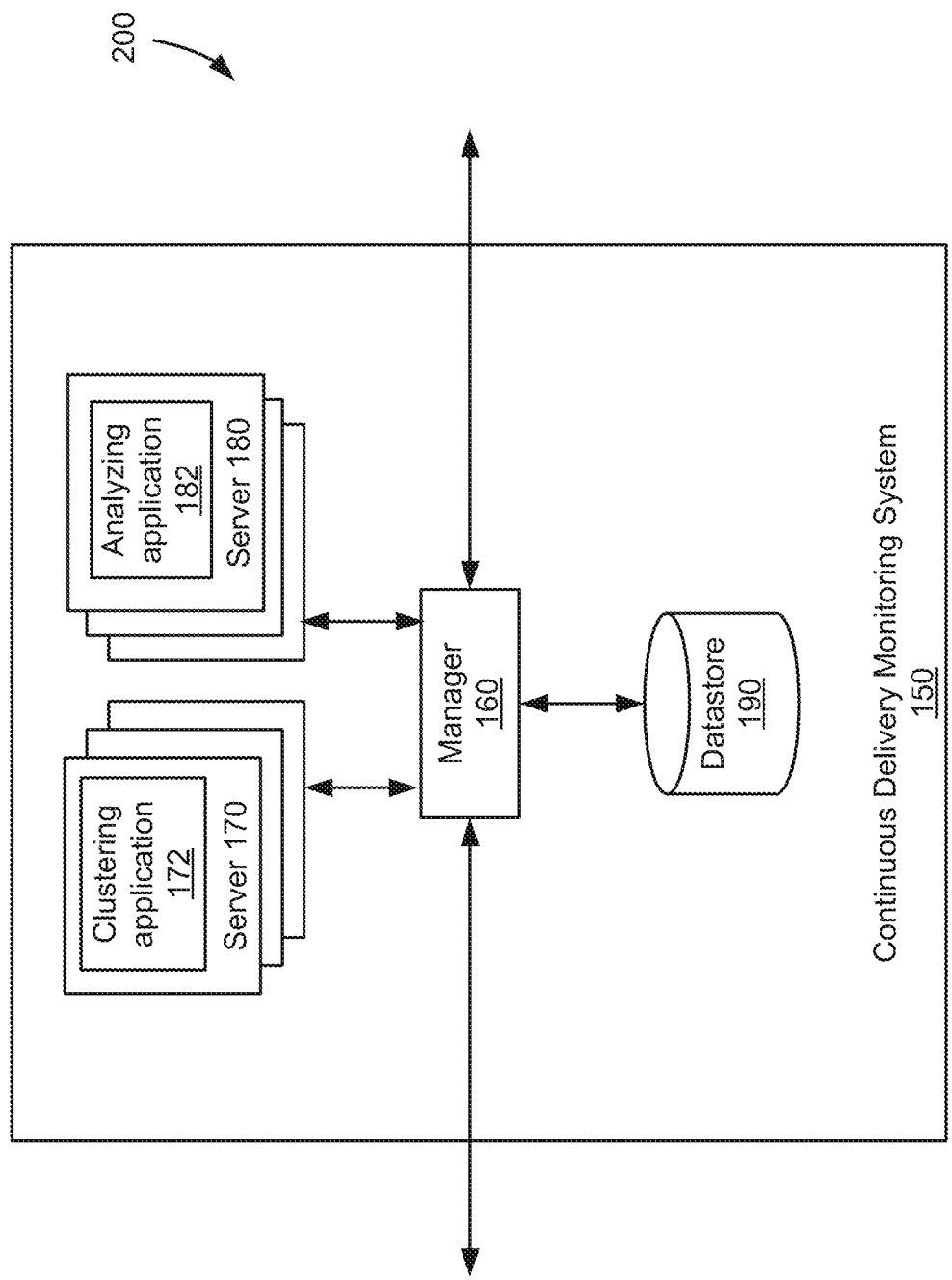
FIG. 2 is a block diagram of a continuous delivery monitoring system.

FIG. 2 is a block diagram of a continuous delivery monitoring system. The block diagram of FIG. 2 provides more detail of continuous delivery monitoring system 150 illustrated in FIG. 1. Continuous delivery monitoring system 150 includes manager 160, servers 170 and 180, and data store 190. Manager 160 may communicate with delegates 102, 132, and 138, provide them with tasks, instructions, and updates. For example, manager 160 can receive data from a delegate such as metrics, log information, time series data, and other data, initiate data analyzing and clustering, process data at data store 190, and report information to client device 195 for user.

Server 170 may include clustering application 172. In some instances, manager 160 may provide learned representations of real-time metric data to clustering application 172 for clustering. The data may be clustered based on similarity, probability, and/or other information as described elsewhere herein.

Server 180 includes analyzing application 182. Analyzing application 182 may analyze clustered and raw data provided by manager 160 and/or 172 to identify anomalies, service regressions, predict future behavior, and other analysis.

Data store 190 may communicate with manager 160 and may be used to persist time series data streams received by manager 160.

Figure 3:
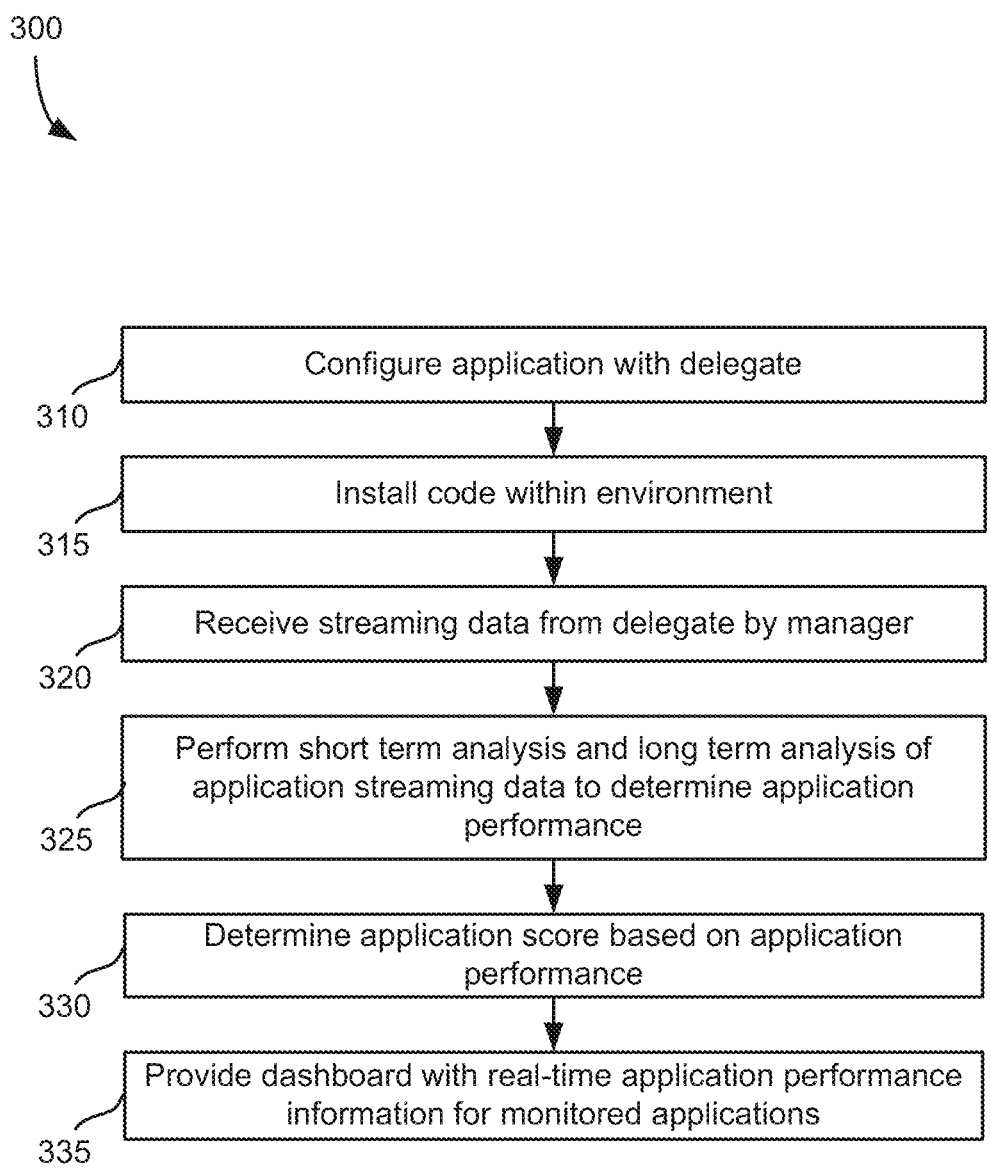
FIG. 3 is a method for reporting the status and results of continuous delivery system monitoring.

FIG. 3 illustrates an overview of a method for monitoring a continuous delivery system. FIGS. 4-7 provide more detail for portions of FIG. 3.

FIG. 3 is a method for reporting the status and results of continuous delivery system monitoring. An application to be monitored may be configured with a delegate at step 310. Configuring an application with a delegate may include installing the delegate to the particular application (e.g., host). The configuration may also include configuring the delegate with which data to capture, which managers (e.g., servers and applications) to communicate with, and other configuration tasks.

In some instances, code may be installed within an environment 120 at step 315. The installed code can update one or more applications within the environment. The software update from the installed code may be installed in a portion of applications or nodes to enable an analysis as to whether the updated applications, or nodes, that include the software update behave differently than the applications/nodes without the update. For example, for a given number of nodes that a software update might apply to, only 5% of the nodes may initially be updated with the software update to determine if the nodes operate as expected with the update. The remainder of the nodes/applications may be updated in phases or in some other fashion.

The timing of step 315 can vary. For example, code may be installed within the environment before or after a short-term analysis at step 325, before or after a short-term analysis or long-term analysis. As such, an analysis as discussed with respect to the method of FIG. 3 may be performed before or after code is installed within the environment.

Streaming data may be received by a manager module from the delegate at a remote machine at step 320. Receiving the streaming data may include initial communications between the manager and the delegate, followed by transmission of the data from the delegate to the manager. The streaming data may include timeseries data, log data, and/or other data.

One or more short-term analysis and/or one or more long-term analysis of the application streaming data is performed at step 325. The short-term analysis may include comparing chunks of the streaming data to one or more blocks of historical streaming data received by the manager module or application over a period of time. The historical data may be data associated with a relatively short period of time, such as for example the last 120 minutes.

Another short-term analysis using neural networks can also be performed on the received streaming data. The short-term analysis using the neural networks involves training a prediction system such as a neural network. Training can include providing a number of inputs into a neural network, the network may reduce the number of inputs, process the reduced input using a function, such as for example a cost function, and then reconstruct the input as an output. The output is then compared to the input to create an error profile.

After the neural network is trained and an error profile is constructed, the trained network is used to predict bad data such as anomalies. The suspect chunk of data is passed into the trained network as input. The data is processed, the number of inputs is reduced, the resulting data is processed using a function such as a cost function, and an output is constructed from the output of the cost function. The output is compared to the input of the model, and the resulting error from the comparison is compared to the error profile from training to determine if the streaming data is acceptable based on the comparison of the error function.

A long-term analysis can be performed on the streaming data that compares chunks of recently received streaming data to previously received streaming data determined to be undesirable data. A long-term analysis may also include performing a historical data comparison on the recently received streaming data. More detail for performing one or more short analysis and long-term analysis is discussed with respect to the method of FIG. 4.

After analyzing the results of the continuous application monitoring, an application score is determined at step 330. The application score can be determined based on application performance, derived at least in part from one or more short term analysis and long-term analysis performed on the application streaming data. Determining the application score can include accessing application transaction metrics, anomalies, and trends, determining a score for each metric combination, and combining the scores for to calculate an application score. More detail for determining an application score is discussed with respect to the method of FIG. 5.

A dashboard with real-time application performance information for monitored applications is provided at step 335. Providing a dashboard with application performance information can include generating a scaled application performance score, and updating a content page with updated application performance information based on the scaled application performance score. Additional levels of transactional details can be provided in response to input received through the interactive dashboard. More details for providing a dashboard are discussed with respect to the method of FIG. 6. Examples of dashboards are provided in FIGS. 8-11.

Figure 4:
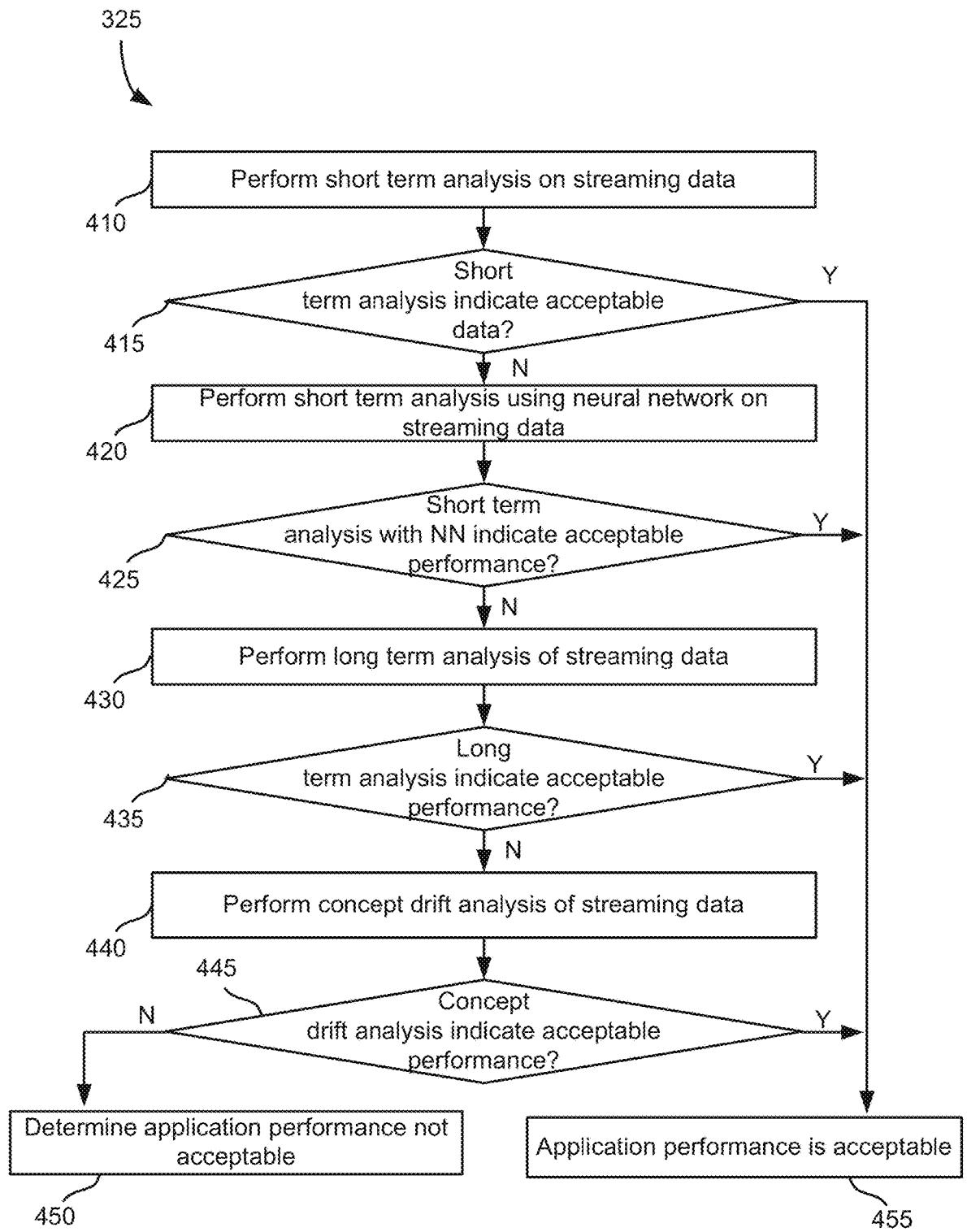
FIG. 4 is a method for performing a short-term analysis and long-term analysis of application streaming data.

FIG. 4 is a method for performing a short-term analysis and long-term analysis of application streaming data. The method of FIG. 4 provides more detail for step 325 of the method of FIG. 3. First, a short-term analysis is performed on streaming data at step 410. To perform the short-term analysis at step 410, the application may be monitored for a period of time to establish a baseline of performance for the application, and/or collect a set of data over which one or more data patterns and behaviors (e.g., patterns or behaviors in the values of metrics associated with application performance and calculated periodically over the period of time) can be viewed. In some instances, the application may be monitored for a period of 15 minutes, 30 minutes, 60 minutes, 120 minutes, or some other period of time.

A recent chunk of streaming data received from a delegate monitoring the application is then selected. In some instances, the most recent chunk may be the most recent 10, 15, or 20 minutes of metric data, or some other period of time of streaming data.

A first block of data collected during the monitoring but previous to the recent chunk of data is then selected, such as the most recent 15 minutes of streaming data received just prior to the recent chunk for the period of time. Hence, if data has been collected for an application for 120 minutes, the recent chunk may be the most recent 15 minutes, and the first block may be the data associated with 15-30 minutes back into the collected data.

The recent chunk is compared to the selected block of past data. In some instances, the comparison may be performed using a moving window method, comparing the values of the recent chunk of data to the selected block of past data. A determination is made as to whether the chunk of data is within a tolerance of the selected block of data at step 430. In some instances, the tolerance may be within a first or second standard deviation, within a certain percentage such as 30% of the data within the selected block, or some other tolerance. In some instances, other pattern recognizing machines and/or probabilistic approaches can be used. If the chunk data is within a tolerance of the block data, the selected chunk is determined to be acceptable data. If the chunk is not within the tolerance, a determination is made as to whether additional blocks are available to compare to the chunk. If additional blocks of the past data are available to compare, the next available block of past data is selected for comparison to the chunk. The short-term analysis then continues wherein the selected block and the chunk are compared. If no additional blocks are available to compare, it is determined that the chunk does not match the past data according to a short-term analysis.

If the short-term analysis indicates the data is acceptable, the application performance is deemed acceptable at step 455. If the short-term analysis indicates the data is not acceptable, then a short-term analysis using neural networks is performed on the streaming data at step 420.

Performing a short-term analysis of application streaming data using neural networks includes receiving an n-dimensional input by an encoder. The n-dimensional input may include streaming data, different metrics associated with an application, and/or other data associated with application performance. The n-dimensional input may then be converted into a reduced dimensional input. In some instances, neuron modules of the neural network are used to convert the n-dimensional input into a reduced dimensional input. In some instances, the input may be converted from a five-dimensional input into a three-dimensional input.

A cost function is applied to the reduced dimensional input, and the output is then used to reconstruct the n-dimensional input. The output n-dimensional output is then compared to the original n-dimensional input and a reconstruction error is generated based on the comparison of the n-dimensional input and the n-dimensional output. The reconstruction error is then compared to reconstruction errors generated by the model from training data to determine if the construction error generated is within an acceptable threshold. If the reconstruction error is within an acceptable threshold, the data chunk for the n-dimensional input is determined to be acceptable. If the reconstruction error is not within an acceptable threshold, the data chunk for the n-dimensional input is determined to be not acceptable.

In some instances, the neural network-based short-term analysis may utilize a variational auto-encoder to process and ultimately reconstruct the n-dimensional input. The variational auto-encoder can map a high dimensional and complex input data to a latent space with a lower dimension. In some instances, the second short-term analysis may be performed at least in part by a machine other than a neural network. For example, other pattern recognizing machines could be used in place of an artificial neural network to generate a reconstruction error and determine if the data associated with the n-dimensional input is acceptable or not.

In any case, if the neural network-based short-term analysis indicates acceptable performance, the method of FIG. 4 continues to step 455. If the neural network-based short-term analysis indicates unacceptable performance, the method of FIG. 4 continues to step 430 where a long-term analysis is performed.

The long-term analysis begins with accessing and comparing a data chunk to long-term cached data chunks. The long-term cached data chunks may include one or more data chunks previously identified as unacceptable data by a first short-term analysis and a second short-term analysis using machine learning. If the suspect data chunk does not match any long-term cached data chunks, the suspect data chunk is stored as a new bad data chunk. If the compared data chunks match within a tolerance, such as for example within standard deviation or a percentage of the long-term data chunk, a count for the cached matching data chunk is increased.

A determination is made as to whether a count for the stored data chunk satisfies a threshold count. In some instances, the threshold count may include three, four, five, or some other number of matches. In some instances, if a data chunk stored in long-term cache is matched to suspect data chunks a certain number of times, then the cached data chunk is determined to be an acceptable data chunk and is added to "good data"—data used for comparison to streaming data for a short-term analysis. If the count for the stored data chunk satisfies a threshold, the store data chunk is added to the good data used to perform a short-term analysis. The store data chunk is then removed from long-term cached data.

If the count for the long-term cached data does not satisfy the threshold, a determination is made as to whether the data chunk matches a historical data check. A historical data check can then be performed, which compares the suspect data chunk with other data chunks that have matching or similar historical parameters. For example, the suspect data chunk may be compared to other data chunks that were streamed at the same time and on the same day of the week, at the same time on the same day of the month, or other data chunks having similar historical parameters. If the data chunk does match the historical data check, the stored data chunk is added to the good data. If the data chunk does not match the historical data check, an alert is generated that the stored data chunk is not acceptable.

If the long-term analysis indicates acceptable performance at step 435, the application performance is determined to be acceptable at step 455. If the long-term analysis indicates unacceptable performance, the method of FIG. 4 continues to step 440 where a concept drift analysis is performed.

More details for analyzing the health of an application are disclosed in U.S. patent application Ser. No. 16/690,137, filed on Nov. 21, 2019, entitled "Continuous System Service Monitoring Using Real-Time Short-Term and Long-Term Analysis Techniques", the disclosure of which is incorporated herein by reference.

A concept drift analysis is performed on streaming data at step 440. The concept drift analysis begins with detecting a new trend in streaming data received from one or more delegates. The new trend may include an overall upward trend in value, and overall downward trend in value, or some other trend that affects subsequent streaming data values. The detected trend is flagged, and a notification may then be sent to an administrator or user regarding the trend. In response to sending a notification to the user, the user may be provided with an interface, directly or indirectly, for the user to indicate whether the trend is acceptable or unacceptable. In some instances, the notification to the user may include one or more of changes in values, graphical indications of the trend, text, and/or other data. If the user identifies the trend is acceptable, the trend data is added to short-term good data and can be used for short-term analysis. If user identifies the trend as not acceptable, or does not respond to the notification, the trend is not added to the short-term data and will not be added to data use perform short-term analysis.

If the concept drift analysis indicates acceptable performance, the application performance is deemed acceptable at step 455. If the concept drift analysis indicates unacceptable performance, the application performance is deemed unacceptable at step 450.

Figure 5:
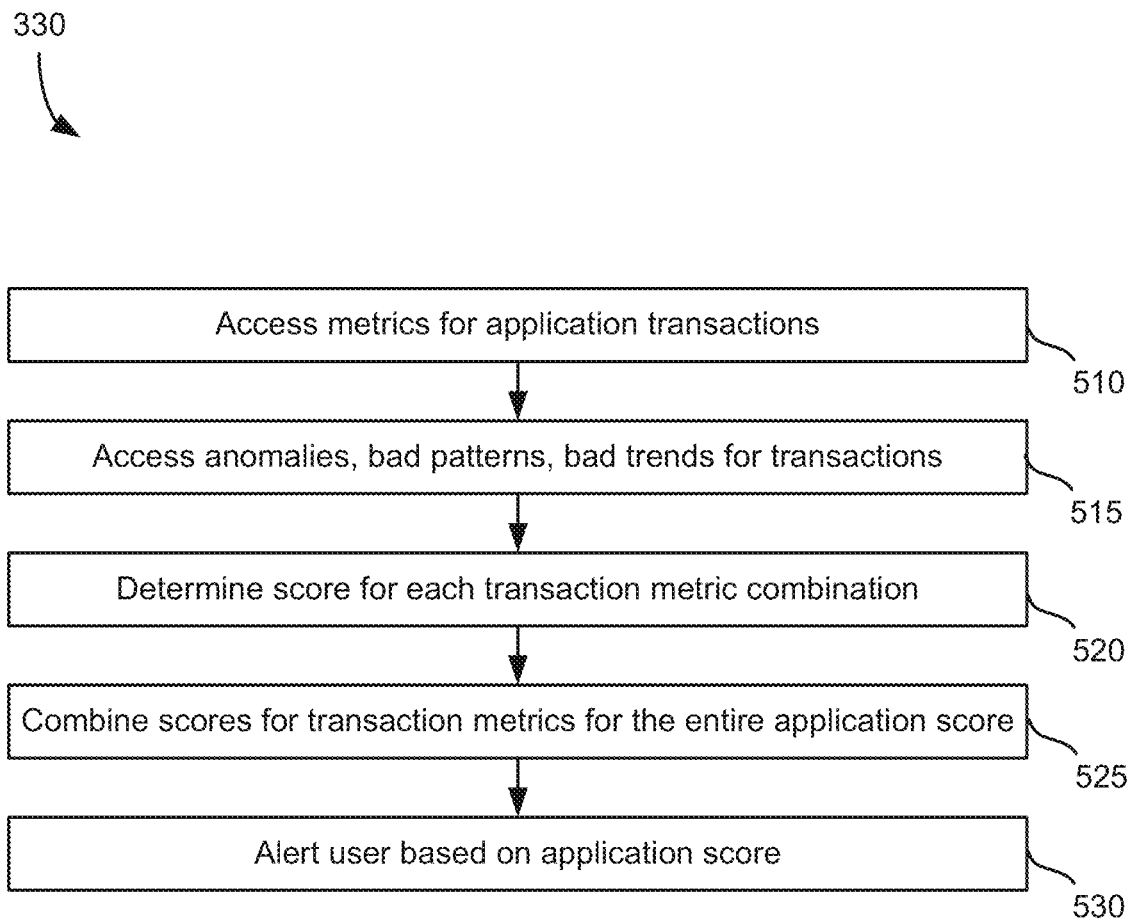
FIG. 5 is a method for determining an application score.

FIG. 5 is a method for determining an application score. The method of FIG. 5 provides more detail for step 330 of the method of FIG. 3. Metrics are accessed for the application transactions at step 510. Data for anomalies, bad patterns, and bad trends for transactions may then be accessed at step 515. A score is determined for each transaction metric combination at step 520. For example, each transaction may have metrics of response time, number of errors, and number of exceptions. For ten transactions, there would be thirty total scores (3 metrics×10 transactions=30 scores).

The scores are then combined for transaction metrics for the entire application score at step 525. The scores may be combined by averaging the scores. In some instances, the scores may be combined by weighted averaging, wherein some scores are weighted more heavily than others, such as for example larger weights for some metrics or larger metrics for some transactions.

A user may be alerted based on the application score at step 530. In some instances, an alert may meet at the application score falls within a particular range, or if it satisfies a particular threshold. For example, on a scale of zero to 1, a score of 1 to 0.6 may indicate a positive score and no alerts, a score of 0.3 up to 0.6 may indicate a lower score and result in an email alert, and a score of below 0.3 may result in an email and a pager message to an administrator.

Figure 6:
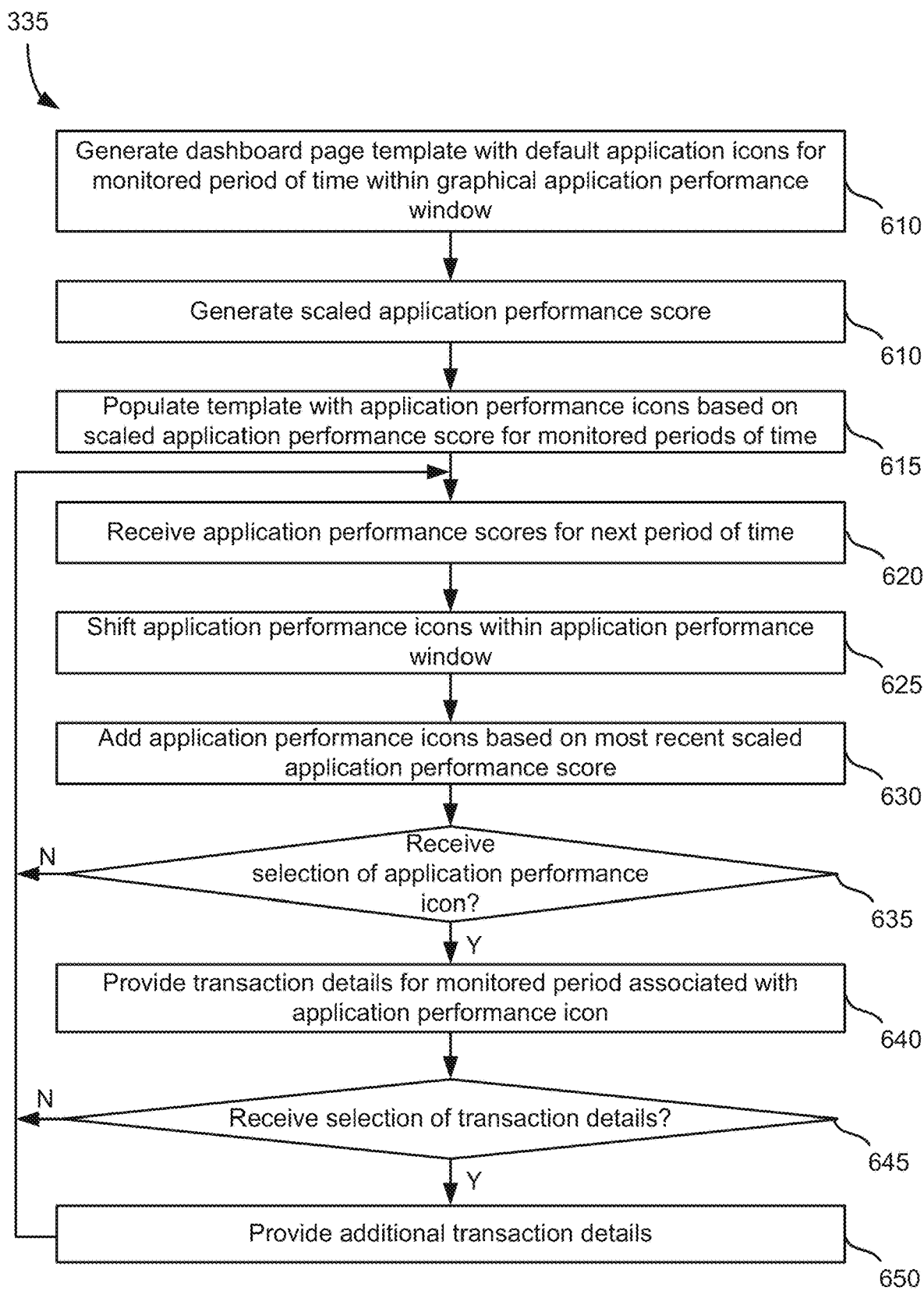
FIG. 6 is a method for providing a dashboard.

FIG. 6 is a method for providing a dashboard. The method of FIG. 6 provides more detail for step 335 of FIG. 3. First, a dashboard page template is generated at step 610. The dashboard page template may be generated with default application icons for monitored periods of time within a graphical application performance window. Scaled application performance scores may be generated at step 610. Application performance scores can be scaled using dimensional components, such as for example "signals". A number of signals can be determined for each transaction, with each signal providing a dimensional component for the transaction. Signals may be determined based on the type of metric (e.g., a value assigned for different types of metrics), the occurrence of a metric value or range of values (e.g., a scaled value based on the number of anomalies for response time), and other features of a metric. A scaled score is generated for the transaction as a whole based on the different dimension values for that transaction. More detail for generating a scaled application performance score is discussed with respect to the method of FIG. 7.

Figure 8:
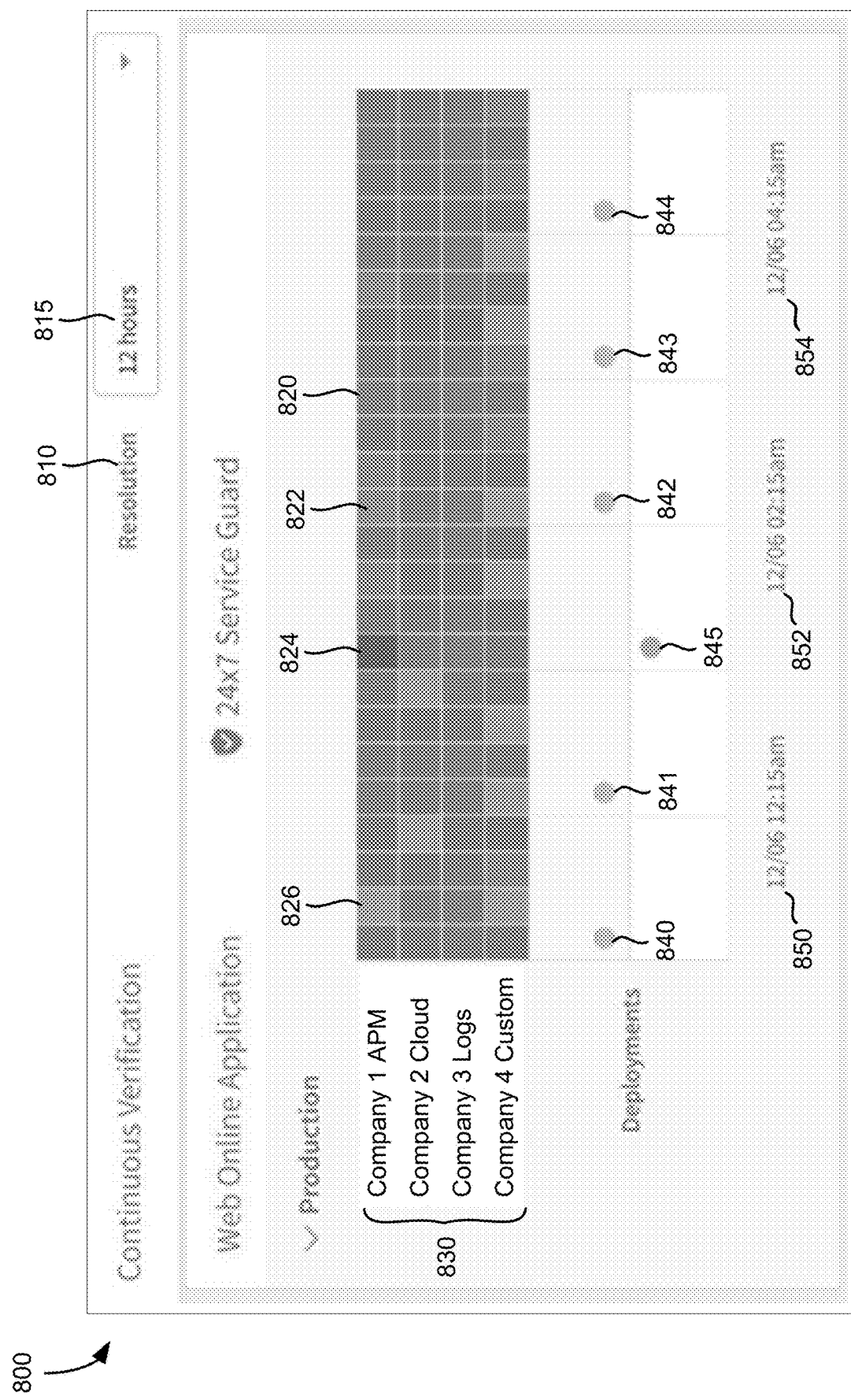
FIG. 8 is a screenshot of an interface for providing continuous verification information.

The template may be populated with application performance icons based on a scaled application performance score for the monitored periods of time at step 615. The application performance icons are populated for a period of time. In the interface of FIG. 8, each vertical column of square icons corresponding to applications 830 correspond to the same time period. Hence, the four icons in column 861 represent a first time period, the icons in column 862 represent a second time period, and so forth.

The application performance icons may be shaded based on the scaled application performance score. For example, a scaled value may be between 1 and 10. The application performance icon may include ten shades, with each shade color corresponding to a scale value. Hence, a scaled value of 10 may correspond to a color of green while a scaled value of 1 corresponds to the color red, and each scaled value between 1 and 10 corresponds to a shaded color between red and green (e.g., with a middle value of 5 or 6 corresponding to a shade of yellow). In the screenshot of the interface for providing continuous verification information in FIG. 8, there are four rows of application performance icons for the four applications 830. In column 861, the uppermost three icons are a first shade of green and lowermost icon is a slightly lighter shade of green. In column 862, all four icons are the same shade of green. In column 822, the upper most icon is a slightly lighter shade of green, the two middle icons are a darker shade of green, and the lowermost icon is a shade of yellow. The interface of FIG. 8 is discussed in more detail below.

Application performance scores for the next period of time are received at step 620. The application performance scores for each time period correspond with a column of icons in the interface of FIG. 8.

Application performance icons currently displayed in the dashboard of a reporting interface (e.g., interface of FIG. 8) are shifted at step 625 within the application performance window. New application performance icons based on the most recent application performance data are added to the application performance window 820 at step 630. In the interface of FIG. 8, the application performance window 820 comprises the grid of twenty-four columns and four rows. Because each column corresponds to a time period, such as for example twelve hours, the currently displayed columns are shifted when new scaled application data is available to display within the application performance window. In some instances, when new scaled application data is available to provide as icons in the application performance window 820, the currently displayed icons shift one column to the left. The newest set of application performance icons is shown in the rightmost column (column 861) and the leftmost column of icons is shifted out of the display.

A determination is made as to whether a selection of application performance icon has been received at step 635. A user may select any application performance icon within the application performance window 820 of the interface of FIG. 8. If a selection of an icon is received, the transaction details for the selected icon during the period associated with the icon are provided within an interface at step 640. The transaction details may be provided in a new interface, overlaid within the interface of FIG. 8, or provided in some other manner. An example of transaction details provided for a selected icon is provided in the interface of FIG. 9. If no selection of an icon is received, the method returns to step 620.

A determination is made as to whether a selection of the transaction details is received at step 645. When the transaction details of an application performance icon are displayed, the transaction details may include information such as the time of any anomalies, an overall risk level, and other data. If a portion of the transaction details are selected, additional transaction details may be provided at step 650. The additional transaction details may include a hierarchical list of the methods that perform the transaction, along with performance information (e.g., response time, error information, percentage of time of entire transaction) for the particular method within the transaction. The additional information may be information collected and/or determined by the present system or information obtained from a remote monitoring service. After providing the additional information, the method of FIG. 6 returns to step 620. If no selection is received at 645, the method of FIG. 6 returns to step 620.

Figure 7:
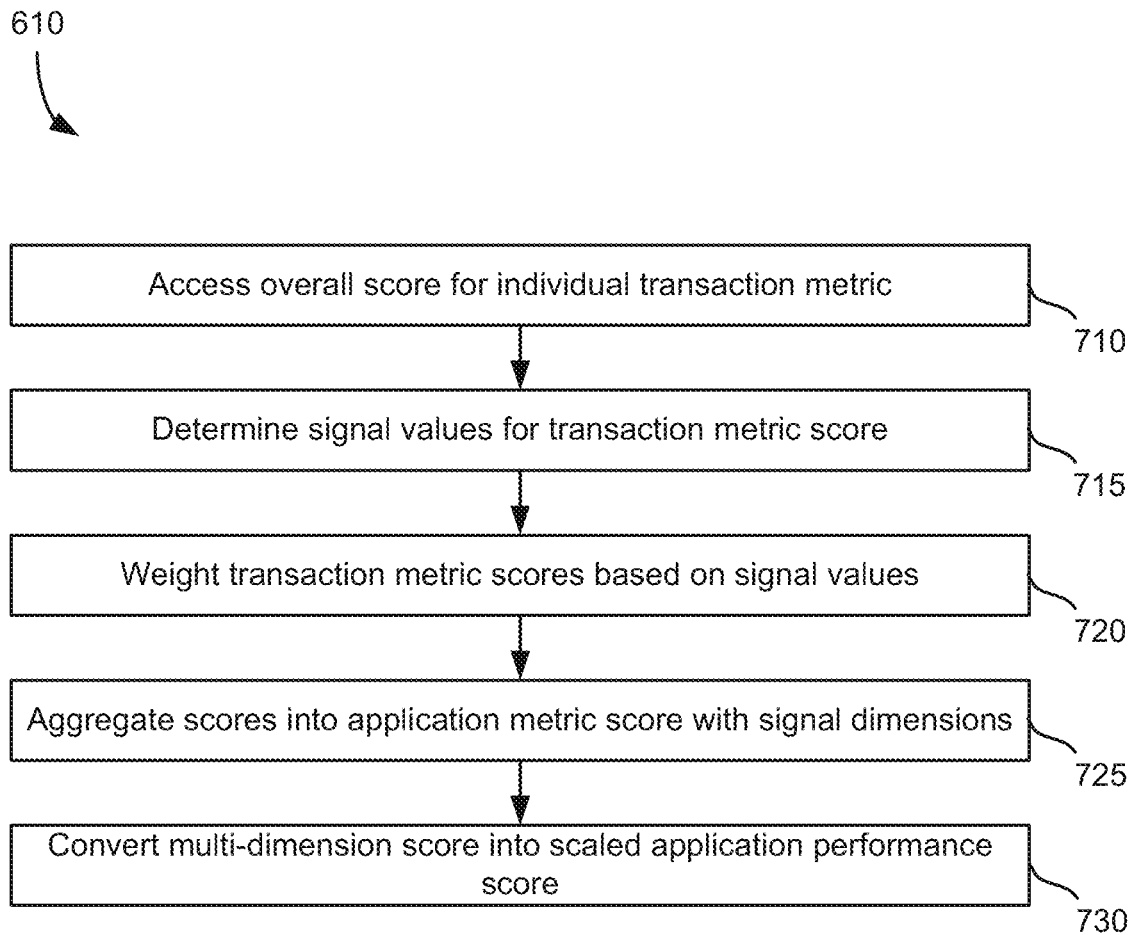
FIG. 7 is a method for generating a scaled application performance score.

FIG. 7 is a method for generating a scaled application performance score. The method of FIG. 7 provides more detail for step 610 of the method of FIG. 6. An overall score for an individual transaction metrics is accessed at step 710. Signal values (i.e., dimensional components) for the transaction metric scores are determined at step 715. The signal values may be determined based on the type of metric, a characteristic of a metric such as whether or the number of times an anomaly is detected within the metric, the number of metric values that are in an expected range, the number of metric values that are in an unexpected range, or some other factor. The transaction metric scores are weighted based on the signal values at step 720. Hence, in some instances, the dimension or signal values are used as weights for the transaction metric scores. The weighted metric scores are then aggregated into application metric scores with signal dimensions at step 725. Hence, in some instances, the weighted metric scores for the transactions of an application are aggregated into a single set of metric scores with signal dimensions for the entire application. The multi-dimension score for the application is then converted into a scaled application performance score at step 730. The scaled application performance score may be between a range of scores, such as for example between one to ten. A value at one end of the scale may indicate that the performance of the application is good (no anomalies), while a value at the opposite end of the scale may indicate that the performance of the application is not good (e.g., has a significant performance issue such as a transaction that fails).

FIG. 8 is a screenshot of an interface for providing continuous verification information. The interface 800 of FIG. 8 includes resolution indicators 810 and 815, application performance window 820, application identifiers 830, deployment indicators 840-844, and deployment details 850-854.

Application performance window 820 includes a number of application performance icons. In the embodiment illustrated in interface 800, the icons are each shaped like a square and positioned alongside each other in columns in rows. In interface 800, the application performance window includes 24 columns and 4 rows of application performance icons. Each application performance icon has one of a plurality of shading levels, corresponding to a scaled value associated with the application for the particular time period. For example, the uppermost icon in the top row, the row associated with the "Company 1 APM" streaming performance information, in column 824 has a red color shading, the uppermost icon in the top row and column 820 has a green colored shading, the upper most icon in column 822 has a lighter color of green shading, and the uppermost icon in column 826 can have a yellow color of shading.

There are four streams of data that pass through the application performance window. The four streams of data are associated with four application 830, which include company 1 APM application, a company 2 cloud application, a company 3 log, and a company 4 custom application.

The resolution of the application performance window may be controlled using the resolution selector 815. Resolution label 810 next to the resolution selector 815 provides for varying the resolution displayed in the application performance window 820. The resolution can be displayed such that one icon represents 5, 10, 15, or 30 minutes, 1, 2, 5, 8, 12, or 18 hours, 1, 2, 4, or 6 days, 1, 2, 3 or 4 weeks, or some other unit of time.

Deployment indicators 840-845 indicate that a deployment occurred within a period of time associated with an application performance icon. The colored shading of the deployment indicators indicates the performance of the application in which the deployment was deployed. For example, deployment indicators 840, 841, 842, 843, and 844 have a green colored shading, indicating that the deployments were successful, and the application is performing well. Deployment indicator 845 has a red colored shading, indicating that the deployment caused a performance issue in the application in which it was deployed.

The application performance window may include time labels that indicate the time associated with particular portions of the application performance window. Time labels 850, 852, and 854 provide time labels of December 2006 12:15 am, December 2006 02:15 am, and December 2006 04:15 am, respectively.

Figure 9:
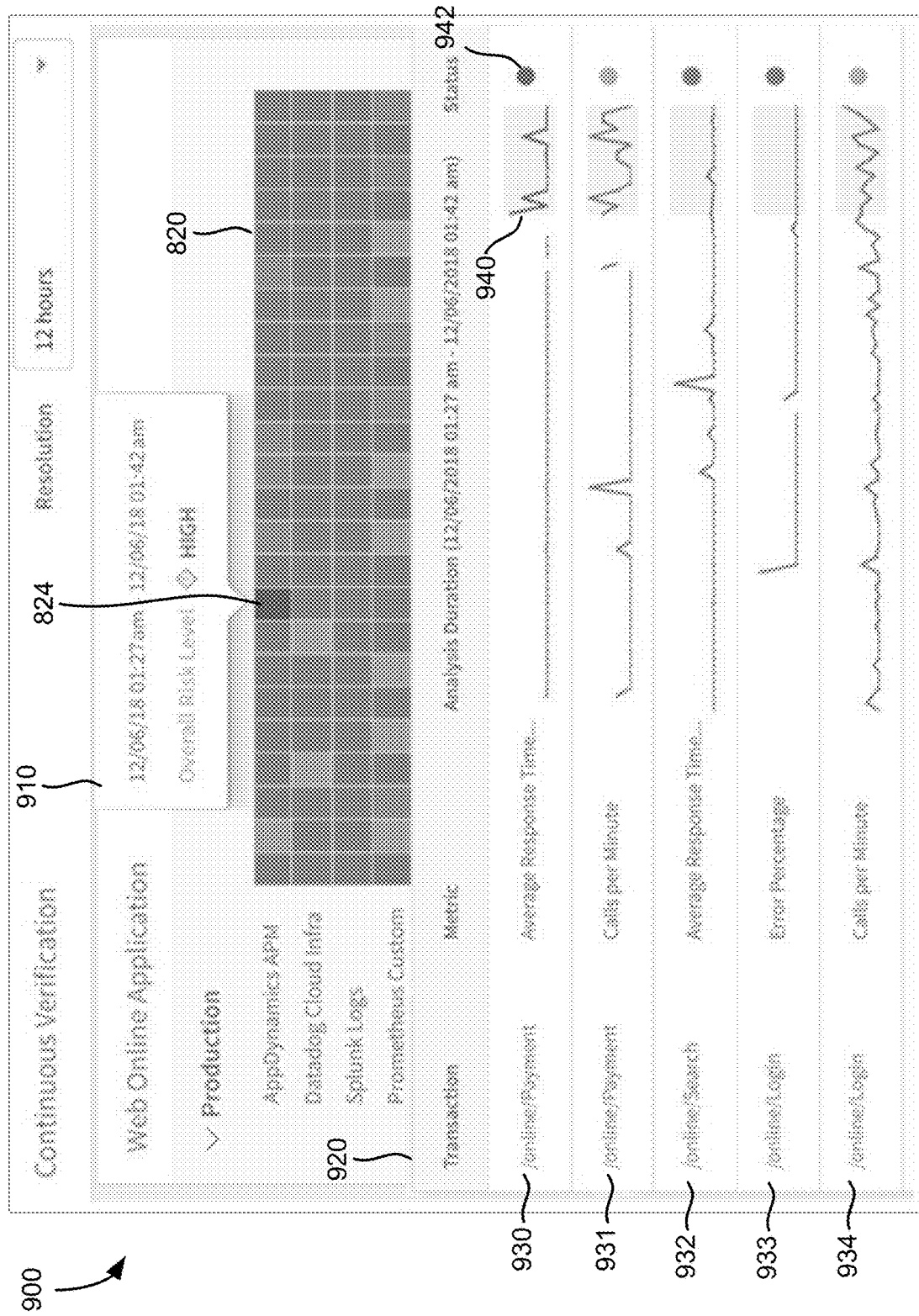
FIG. 9 is a screenshot of an interface for providing continuous verification information for a particular application and time period.

FIG. 9 is a screenshot of an interface for providing continuous verification information for a particular application and time period. In the interface of FIG. 8, when an icon is selected by a user, for example by touching an icon on a touchscreen or moving a mouse over the icon and clicking the icon, additional information regarding the selected icon can be provided to the user. In the interface of FIG. 9, window 910 is displayed when application performance icon 824 is selected by a user. The window 910 may include the time span associated with the selected icon, and a graphical and/or textual representation of the overall risk level for the application during the particular time period. In FIG. 9, the time window indicates that the time window spans from 1:27 am-1:42 am on Dec. 6, 2018 and that the overall risk level is "High."

Figure 10:
FIG. 10 is a screenshot of an interface for providing additional information for a selected application and time period.

FIG. 10 is a screenshot of an interface for providing additional information for a selected application and time period. In the interface of FIG. 9, when a window with additional information is selected by a user, for example by touching the window on a touchscreen or moving a mouse over the window and clicking the icon, additional information regarding the selected application can be provided to the user. In the interface of FIG. 10, a call graph is displayed when the window 910 is selected by a user. When an application performance icon is associated with performance issue, selecting a window associated with the icon can result in a call graph interface 1000 being displayed to the user. The call graph provides additional performance information for the transaction associated with the transaction associated with the lowest performance (or highest performance risk) for the application performance icon.

Figure 11:
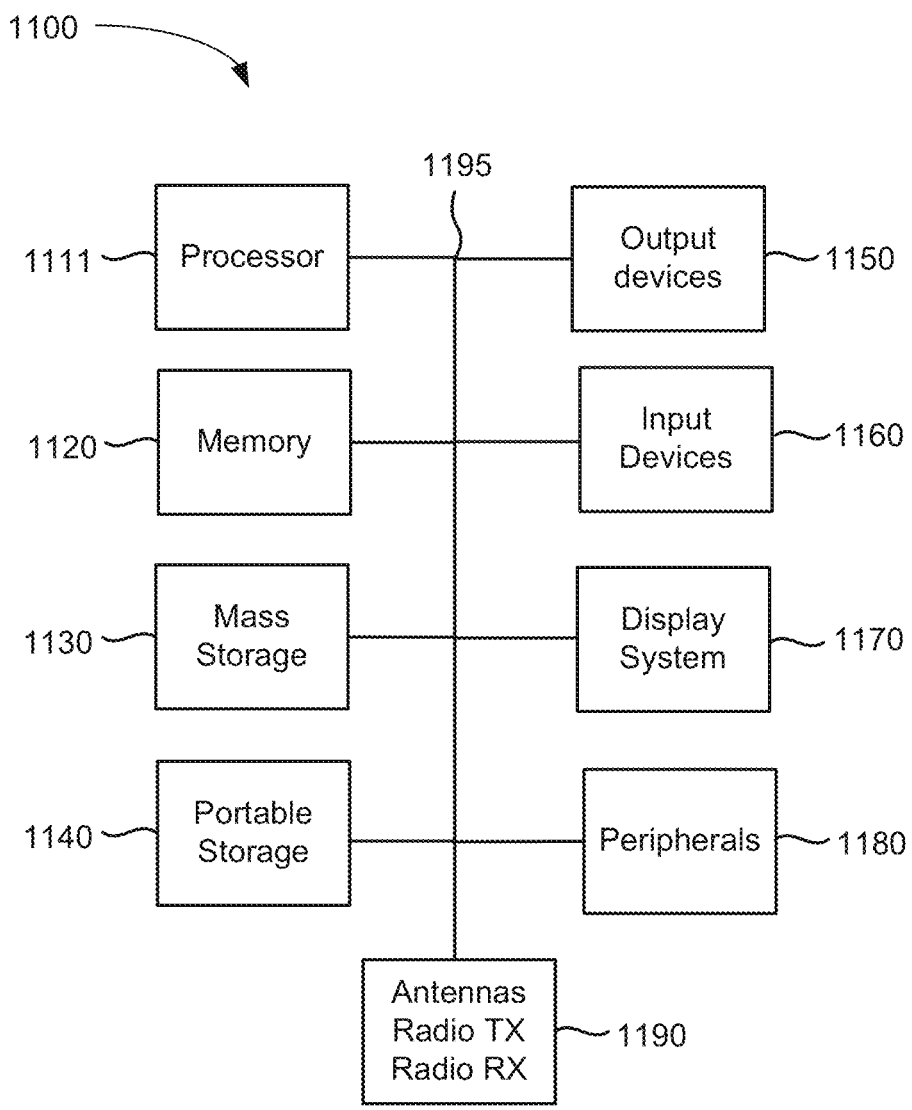
FIG. 11 is a block diagram of a system for implementing machines that implement the present technology.

FIG. 11 is a block diagram of a system for implementing machines that implement the present technology. System 1100 of FIG. 11 may be implemented in the contexts of the likes of machines that implement application program monitoring system 110, machines that host applications 110 and 116, network server 145, manager 160, servers 170 and 180, datastore 190, and client device 195. The computing system 1100 of FIG. 11 includes one or more processors 1110 and memory 1120. Main memory 1120 stores, in part, instructions and data for execution by processor 1110. Main memory 1120 can store the executable code when in operation. The system 1100 of FIG. 11 further includes a mass storage device 1130, portable storage medium drive(s) 1140, output devices 1150, user input devices 1160, a graphics display 1170, and peripheral devices 1180.

The components shown in FIG. 11 are depicted as being connected via a single bus 1190. However, the components may be connected through one or more data transport means. For example, processor unit 1110 and main memory 1120 may be connected via a local microprocessor bus, and the mass storage device 1130, peripheral device(s) 1180, portable storage device 1140, and display system 1170 may be connected via one or more input/output (I/O) buses.

Mass storage device 1130, which may be implemented with a magnetic disk drive, an optical disk drive, a flash drive, or other device, is a non-volatile storage device for storing data and instructions for use by processor unit 1110. Mass storage device 1130 can store the system software for implementing embodiments of the present invention for purposes of loading that software into main memory 1120.

Portable storage device 1140 operates in conjunction with a portable non-volatile storage medium, such as a floppy disk, compact disk or Digital video disc, USB drive, memory card or stick, or other portable or removable memory, to input and output data and code to and from the computer system 1100 of FIG. 11. The system software for implementing embodiments of the present invention may be stored on such a portable medium and input to the computer system 1100 via the portable storage device 1140.

Input devices 1160 provide a portion of a user interface. Input devices 1160 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 1100 as shown in FIG. 11 includes output devices 1150. Examples of suitable output devices include speakers, printers, network interfaces, and monitors.

Display system 1170 may include a liquid crystal display (LCD) or other suitable display device. Display system 1170 receives textual and graphical information and processes the information for output to the display device. Display system 1170 may also receive input as a touch-screen.

Peripherals 1180 may include any type of computer support device to add additional functionality to the computer system. For example, peripheral device(s) 1180 may include a modem or a router, printer, and other device.

The system of 1100 may also include, in some implementations, antennas, radio transmitters and radio receivers 1190. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 1100 of FIG. 11 are those typically found in computer systems that may be suitable for use with embodiments of the present invention and are intended to represent a broad category of such computer components that are well known in the art. Thus, the computer system 1100 of FIG. 11 can be a personal computer, handheld computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for automatically reporting the health of a continuously monitored application; comprising:
   receiving, by an application on a server, data from a delegate on a remote machine, the delegate collecting data from a node within an application that is currently executing;
   generating weighted transaction metric scores by the application server based on the collected data;
   aggregating the weighted transaction scores by the application server into an application metric score for the application on the remote machine;
   generating a scaled application performance score from the aggregated application metric score; and
   providing the scaled application performance score through an interface provided by the application server to a client device, the scaled application performance score provided with a plurality of other application performance scores through the dashboard, the dashboard continuously updated to provide the most recent scaled application performance scores for one or more applications for which data is collected.

2. The method of claim 1, wherein generating weighted transaction metric scores includes:
   generating two or more dimensional components for each transaction metric; and
   weighting the transaction metric scores based on two or more dimensional components.

3. The method of claim 2, wherein aggregating includes aggregating the transaction metric scores with two or more dimensional components.

4. The method of claim 3, wherein at least one of the two or more dimensional components is based on the transaction type.

5. The method of claim 3, wherein at least one of the two or more dimensional components is based on a count of metric values that are within a particular range.

6. The method of claim 1, wherein the application performance score is provided as a graphical icon, the icon associated with the application's performance during a set period of time and having a color associated with the health of the application during the set period of time, the set period of time one of a plurality of periods of time for which application health is displayed in the interface.

7. The method of claim 1, the interface providing a plurality of graphical icons, each of the icons positioned within the interface based on corresponding time period and application, wherein the plurality of graphical icons are updated to remove the oldest set of graphical icons and add new sets of graphical icons over time.

8. The method of claim 7, the method further comprising:
   receiving input selecting the icon; and
   displaying, in response to the received input, additional application performance information for the application during the time period associated with the selected icon.

9. A non-transitory computer readable storage medium having embodied thereon a program, the program being executable by a processor to perform a method for automatically reporting the health of a continuously monitored application, the method comprising:
   receiving, by an application on a server, data from a delegate on a remote machine, the delegate collecting data from a node within an application that is currently executing;
   generating weighted transaction metric scores by the application server based on the collected data;
   aggregating the weighted transaction scores by the application server into an application metric score for the application on the remote machine;

generating a scaled application performance score from the aggregated application metric score; and providing the scaled application performance score through an interface provided by the application server to a client device, the scaled application performance score provided with a plurality of other application performance scores through the dashboard, the dashboard continuously updated to provide the most recent scaled application performance scores for one or more applications for which data is collected.

10. The non-transitory computer readable storage medium of claim 9, wherein generating weighted transaction metric scores includes:

generating two or more dimensional components for each transaction metric; and weighting the transaction metric scores based on the two or more dimensional components.

11. The non-transitory computer readable storage medium of claim 10, wherein aggregating includes aggregating the transaction metric scores with the two or more dimensional components.

12. The non-transitory computer readable storage medium of claim 11, wherein at least one dimensional component of the two or more dimensional components is based on the transaction type.

13. The non-transitory computer readable storage medium of claim 11, wherein at least one dimensional component of the two or more dimensional components is based on a count of metric values that are within a particular range.

14. The non-transitory computer readable storage medium of claim 9, wherein the called application performance score is provided as a graphical icon, the icon associated with the application's performance during a set period of time and having a color associated with the health of the application during the set period of time, the set period of time one of a plurality of periods of time for which application health is displayed in the interface.

15. The non-transitory computer readable storage medium of claim 9, the interface providing a plurality of graphical icons, each of the icons positioned within the interface based on corresponding time period and application, wherein the plurality of graphical icons are updated to remove the oldest set of graphical icons and add new sets of graphical icons over time.

16. The non-transitory computer readable storage medium of claim 15, the method further comprising:

receiving input selecting the icon; and displaying, in response to the received input, additional application performance information for the application during the time period associated with the selected icon.

17. A system for automatically reporting the health of a continuously monitored application;

comprising:

a server including a memory and a processor; and one or more modules stored in the memory and executed by the processor to receive, by an application on a server, data from a delegate on a remote machine, the delegate collecting data from a node within an application that is currently executing, generate weighted transaction metric scores by the application server based on the collected data, aggregate the weighted transaction scores by the application server into an application metric score for the application on the remote machine, generate a scaled application performance score from the aggregated application metric score, and provide the scaled application performance score through an interface provided by the application server to a client device, the scaled application performance score provided with a plurality of other application performance scores through the dashboard, the dashboard continuously updated to provide the most recent scaled application performance scores for one or more applications for which data is collected.

18. The system of claim 17, wherein generating weighted transaction metric scores includes:

generating two or more dimensional components for each transaction metric; and weighting the transaction metric scores based on the two or more dimensional components.

19. The system of claim 18, wherein aggregating includes aggregating the transaction metric scores with the two or more dimensional components.

20. The system of claim 17, wherein the called application performance score is provided as a graphical icon, the icon associated with the application's performance during a set period of time and having a color associated with the health of the application during the set period of time, the set period of time one of a plurality of periods of time for which application health is displayed in the interface.

* * * * *